(12) United States Patent
Truax et al.

(10) Patent No.: US 7,387,077 B1
(45) Date of Patent: Jun. 17, 2008

(54) SEED PLANTER

(75) Inventors: James R. Truax, Minneapolis, MN (US); James A. Willmore, Eden Prairie, MN (US)

(73) Assignee: Truax Company, Inc., New Hope, MN (US)

( * ) Notice: Subject to any disclaimer, the term of this patent is extended or adjusted under 35 U.S.C. 154(b) by 158 days.

(21) Appl. No.: 11/493,949

(22) Filed: Jul. 27, 2006

Related U.S. Application Data (60) Provisional application No. 60/708,899, filed on Aug. 17, 2005.

(51) Int. Cl.
- *A01C 5/00* (2006.01)
- *A01B 15/16* (2006.01)
- *A01B 23/06* (2006.01)

(52) U.S. Cl. .................. 111/135; 111/69; 111/167; 111/200

(58) Field of Classification Search ............... 111/135, 111/69, 167, 200, 18, 52, 62, 134, 136, 149, 111/157, 163
See application file for complete search history.

(56) References Cited

U.S. PATENT DOCUMENTS

| | | | |
|---|---|---|---|
| 5,074,227 A | 12/1991 | Schwitters | |
| 5,279,236 A | 1/1994 | Truax | |
| 5,359,948 A | 11/1994 | Makkink | |
| 6,688,242 B2 | 2/2004 | Meyer et al. | |
| 6,752,094 B1 | 6/2004 | Truax | |

OTHER PUBLICATIONS

John Deere Consumer Products, Inc.; "New 1790 Front-Fold Planter," pp. 10-12: date unknown; Charlotte, NC.

*Primary Examiner*—Christopher J. Novosad
(74) *Attorney, Agent, or Firm*—DuFault Law Firm, P.C.; Dustin R. DuFault

(57) ABSTRACT

A seed planter has at least one rock shaft carrying a rank of planter assemblies. Each planter assembly includes a torsion joint assembly connected to the rock shaft, a planting equipment linkage connected to the torsion joint, a planting equipment yoke connected to the linkage and planting tools or equipment connected to the yoke. The planting equipment linkage is a modified parallelogram linkage that keeps the planting equipment in consistent alignment over the ground even as the seed planter traverses irregular terrain. The seed planter includes a stop mechanism that limits the amount of permissible rotation of the torsion joint on the rock shaft. A stop plate is attached to the torsion joint housing for rotation with it relative to the rock shaft. An edge of the stop plate faces the rock shaft and has a jaw opening defined by upper and lower jaws that at least partially encompasses the rock shaft. Upon rotation beyond limits, the jaws intercept and lock on the rock shaft surfaces to stop further rotation between the torsion joint housing and the rock shaft. The weight of the planter assembly is thereafter carried by the stop plate and the rock shaft and not by torsion spring elements of the torsion joint assembly.

15 Claims, 9 Drawing Sheets

SEED PLANTER

CROSS REFERENCE TO RELATED APPLICATION

This application claims the benefit of U.S. Provisional Patent Application Ser. No. 60/708,899 filed Aug. 17, 2005.

BACKGROUND OF THE INVENTION

U.S. Pat. No. 6,752,094 issued to James R. Truax on Jun. 22, 2004 discloses a no-till seed planter with a wheel mounted frame having one or more transverse rock shafts each carrying a rank of seed planter assemblies. Each planter assembly includes planting equipment mounted on a planting equipment frame that is connected to one end of a mounting beam. The other end of the mounting beam is connected to a torsion joint attached to the rock shaft.

The rock shaft has a generally square cross-section shape. The torsion joint is the type having a box-like housing that is mounted diagonally on the rock shaft. Spaces formed between interior corners of housing and the flat sides of the rock shaft are filled with bar-like torsion spring elements. Rotational movement of the torsion joint housing, as when the planter assembly traverses irregular terrain, results in a return moment produced by deformation of the torsion spring elements.

The planter assemblies have the capacity for up and down movement relative to the rock shaft by virtue of the torsion joint. As the furrowing disk, depth gauge wheel and seed shoe of a planter assembly move over irregular terrain it is desirable that these pieces of equipment maintain a consistent alignment with the seed planter frame instead of following the ground irregularities. However a serial connection of the mounting beam with the planting equipment results in a rotation of the planting equipment and a deviation of the preferred alignment. The resultant angular disposition of the planting equipment during such an encounter with irregular terrain compromises planting efficiency.

Extreme rotation of the planter assembly on the rock shaft can tend to move the torsion joint housing to an over-center position and dislodge the torsion spring elements. A mechanism for limiting the permissible amount of rotation of the torsion joint housing relative to the rock shaft is desirable.

SUMMARY OF THE INVENTION

The invention pertains to a seed planter of the type disclosed in U.S. Pat. No. 6,752,094 incorporated herein by reference. The seed planter has at least one rock shaft carrying a rank of planter assemblies. Each planter assembly includes a torsion joint assembly connected to the rock shaft, a planting equipment linkage connected to the torsion joint, and planting tools or equipment. The planting tools typically include a furrowing disk, a depth gauge wheel, a seed shoe and a press wheel which are mounted to a planting tool yoke or frame. The yoke is connected to the planting equipment linkage. The planting equipment linkage is a modified parallelogram linkage. The parallelogram linkage keeps the planting equipment in consistent alignment over the ground even as the seed planter traverses irregular terrain.

The seed planter includes a stop mechanism that limits the amount of permissible rotation of the torsion joint on the rock shaft. A stop plate is attached to the torsion joint housing for rotation with it relative to the rock shaft. An edge of the stop plate faces the rock shaft and has an open jaw configuration. The jaw opening at least partially encompasses the rock shaft. The jaw opening is defined between an upper jaw and a lower jaw and is configured so to let the rock shaft rotate within predefined limits. Upon rotation beyond limits, the jaws intercept and lock on the rock shaft surfaces to stop further rotation between the torsion joint housing and the rock shaft. The weight of the planter assembly is thereafter carried by the stop plate and the rock shaft and not by torsion spring elements of the torsion joint assembly.

DESCRIPTION OF PREFERRED EMBODIMENTS

Figure 1:
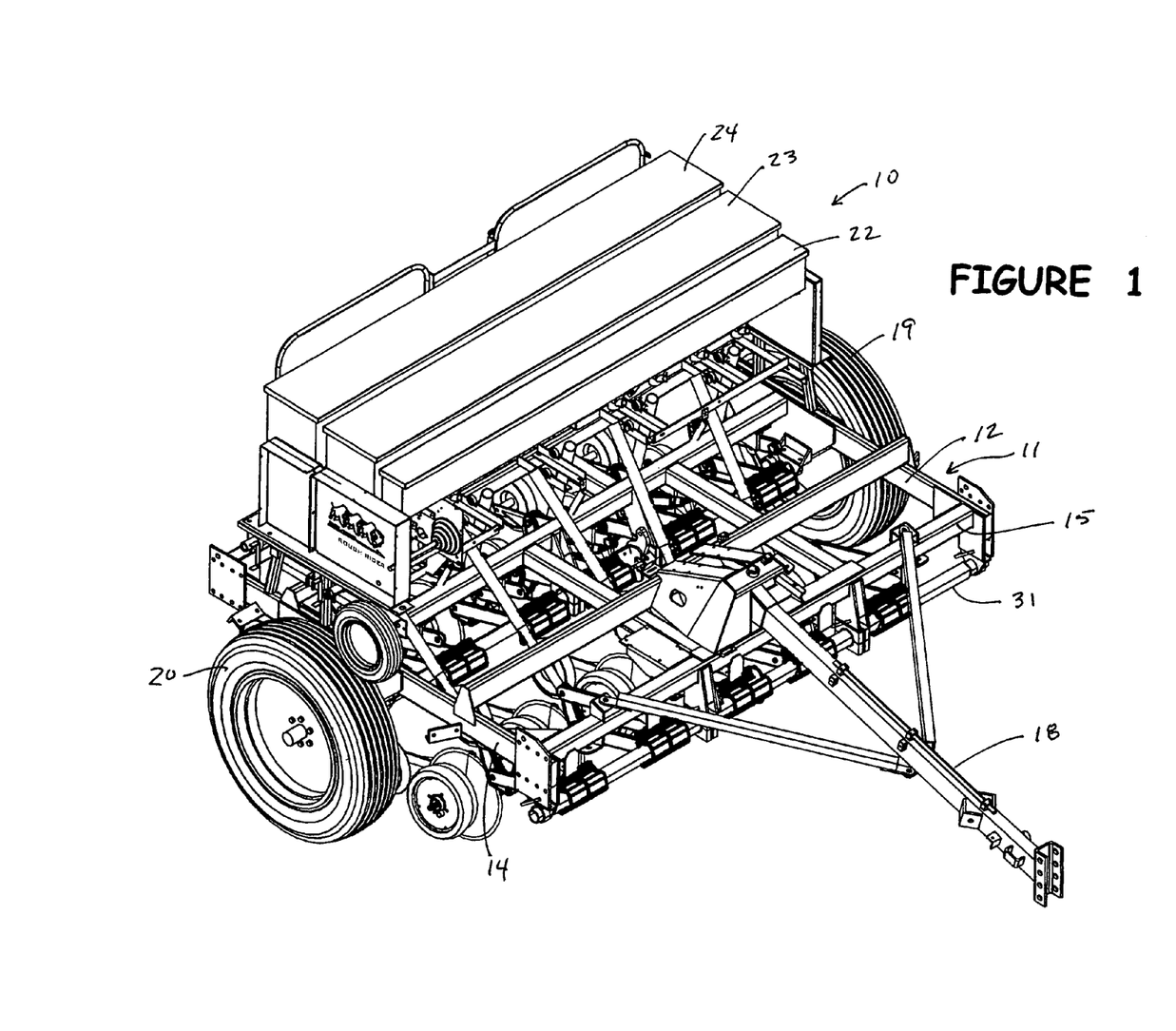
FIG. 1 is a perspective view of a seed planter according to an embodiment of the invention.
Figure 2:
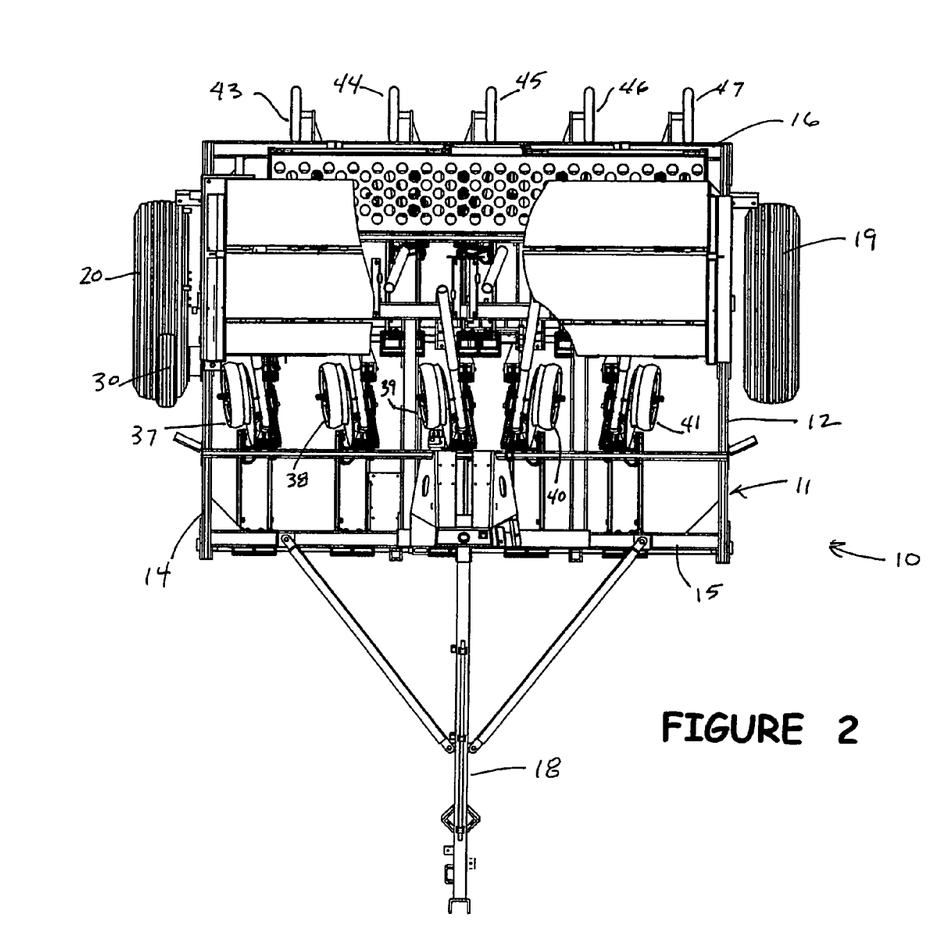
FIG. 2 is a top view of the seed planter of FIG. 1 with portions broken away for purposes of illustration.
Figure 3:
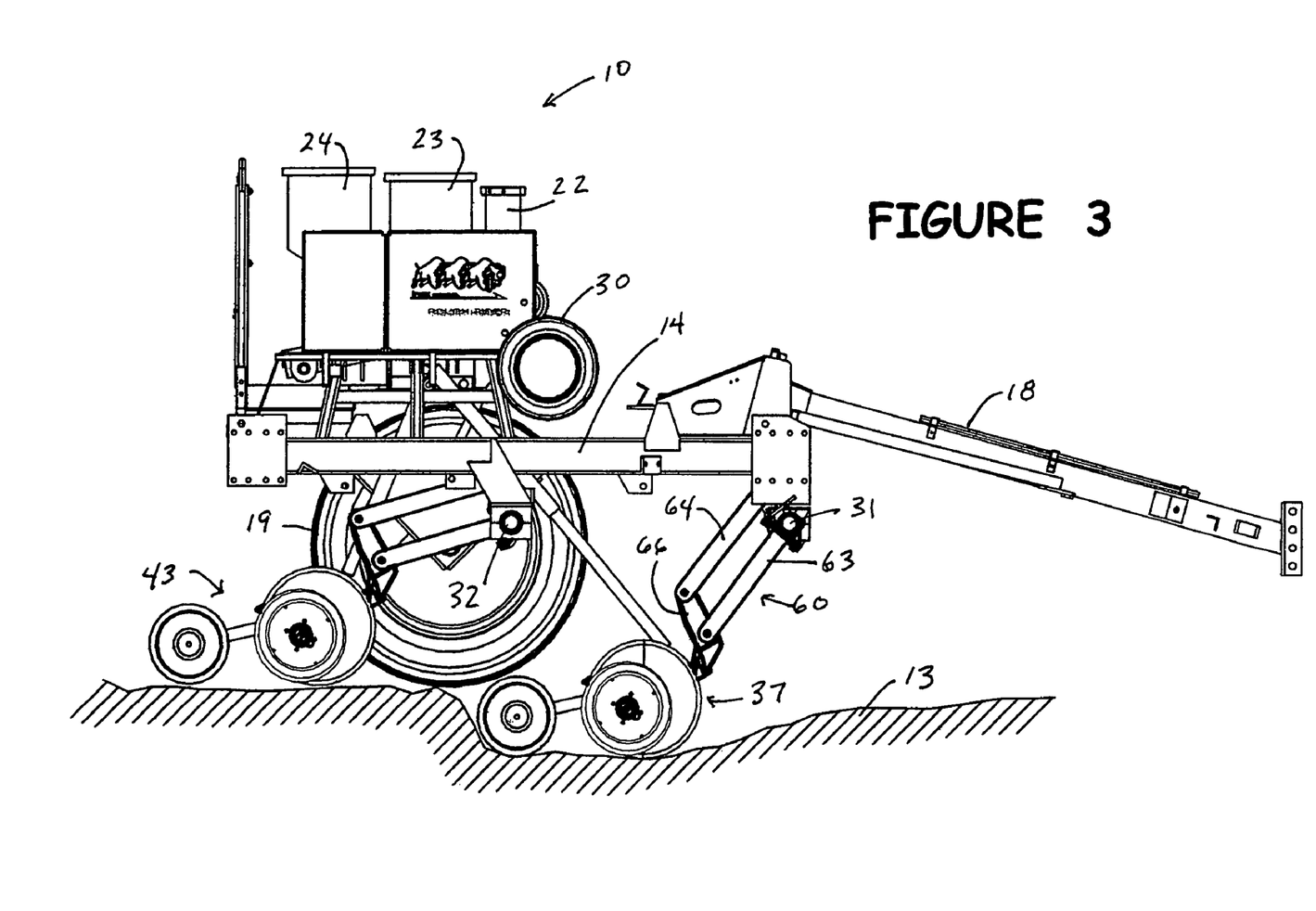
FIG. 3 is a side view of the seed planter of FIG. 1 with portions broken away for purposes of illustration and with the planter assemblies in working position.

Referring to the drawings, there is shown in FIGS. 1-3 a seed planter indicated generally at 10. Machine 10 has a main frame 11 that includes side frame members 12, 13, a front frame member 15 and a rear frame member 16. Frame 11 is carried by wheels 19, 20. A tongue and hitch assembly 18 is connected to the frame 11.

A plurality of seed boxes 22, 23, 24 are mounted on the frame 11. The seed boxes are connected to a seed picker apparatus (not shown) (for example, see U.S. Pat. No. 4,030,428 to Truax) to move seed from the seed boxes to the planter assembly by way of seed tubes. The picker apparatus is operated by a drive wheel 30 that is rotated through frictional engagement with one of the frame wheels 20.

A forward tool bar or rock shaft 31 is connected to and extends laterally across the frame. Forward rock shaft 31 is connected by suitable bearing structure to side frame members 12, 14. Forward rock shaft 31 carries a forward rank of planter assemblies 37-41. An aft tool bar or rock shaft 32 is connected to frame 11 parallel to and spaced aft from the forward rock shaft 31. Aft rock shaft 32 carries an aft rank of planter assemblies 43-47. Each rock shaft is carried by frame 11 for limited rotational movement about a lateral horizontal axis. An L-shaped crank arm 33 is connected to the forward rock shaft 31. A forward hydraulic piston-cylinder motor 34 is connected between frame 11 and L-shaped crank arm 33 for the purpose of rotating rock shaft 31 between working and transport positions. An aft hydraulic piston-cylinder motor is connected between frame 11 and another L-shaped crank arm (not shown) to the aft rock shaft 32 for the same purpose.

Figure 5:
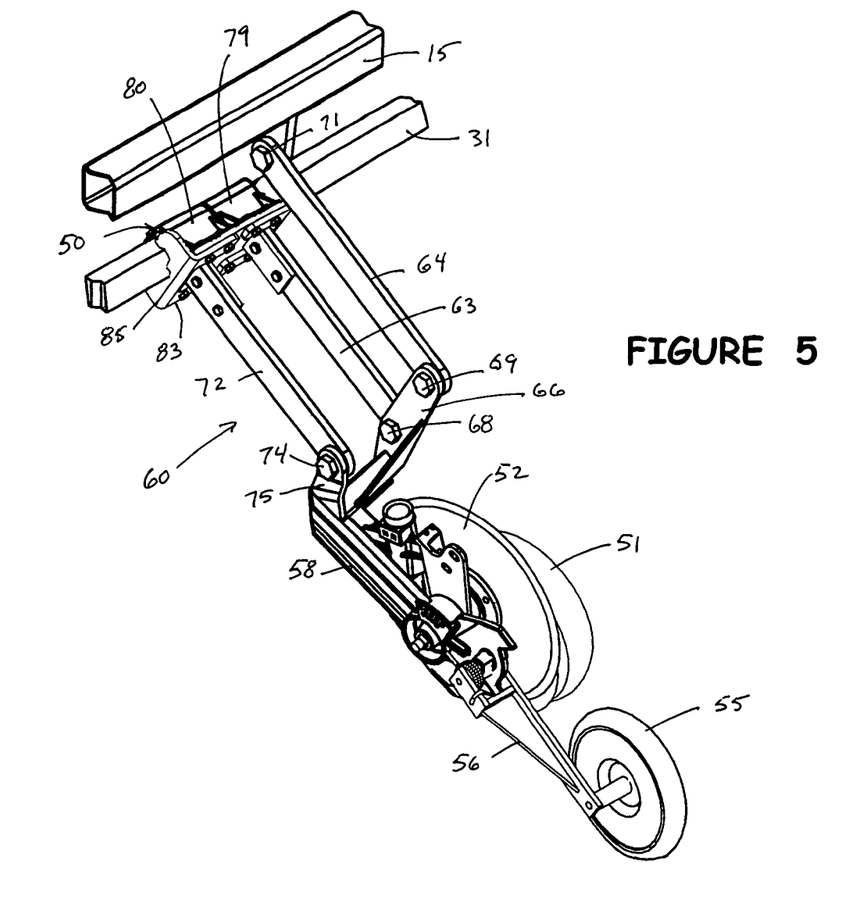
FIG. 5 is a perspective view of the of the planter assembly shown in FIG. 4.

A typical planter assembly is indicated at 37 in FIG. 5. Planter assembly 37 is installed on forward rock shaft 31. The planter assembly includes planting equipment or tools such as a furrowing disk 52, a depth gauge wheel 51, a seed shoe 53 and a press wheel 55 mounted on a press wheel arm 56, all of which are mounted on a yoke or frame 58. Yoke 58 is connected to the lower end of a planting equipment linkage 60. The upper end of planting equipment linkage 60 is connected to the torsion joint assembly 50 that is fixed to forward rock shaft 31.

Torsion joint assembly 50 permits up and down rotation of the planter assembly 37 on the rock shaft. Planting equipment linkage 60 permits up and down movement of the planter assembly 37 while maintaining a consistent angular relationship with frame 11. At the same time linkage 60 tempers side to side movement of the planter assembly. Planter assembly 37 maintains a generally horizontal alignment while traversing mounds or depressions or the like over the terrain.

Planting equipment linkage 60 is a parallelogram type linkage that includes a first lower strut 63 and a parallel upper strut 64. A connecting bar 66 is rigidly connected to the planting equipment yoke 58. A moveable end of the first lower strut 63 is connected at a pivot connection 68 to the connecting bar 66. The moveable end of the upper strut 64 is connected at a pivot connection 69 to the connecting bar 66.

A fixed end of the upper strut 64 is connected at a pivot connection 71 to the transverse frame member 15. A fixed end of the lower strut 63 is connected to the torsion joint assembly 50. Struts 63, 64 comprise two sides of the parallelogram linkage. Bar 66 forms a third side. A forth side parallel to the bar 66 is formed by an imaginary line connecting the pivot axis of torsion joint 50 and the pivot connection 71 of the fixed end of upper strut 64.

A complimentary second lower strut 72 is mounted in parallel relationship to and for coaxial rotation with the first lower strut 63. The upper end of second lower strut 72 is connected to the torsion joint assembly 50. The lower end of second lower strut is pivotally connected at 74 to an upstanding bracket 75 on planting equipment yoke 58. Pivot 74 is coaxial with pivot 69 on connecting link 66. Second lower strut 72 tempers side-to-side displacement of the planting equipment linkage.

Figure 4:
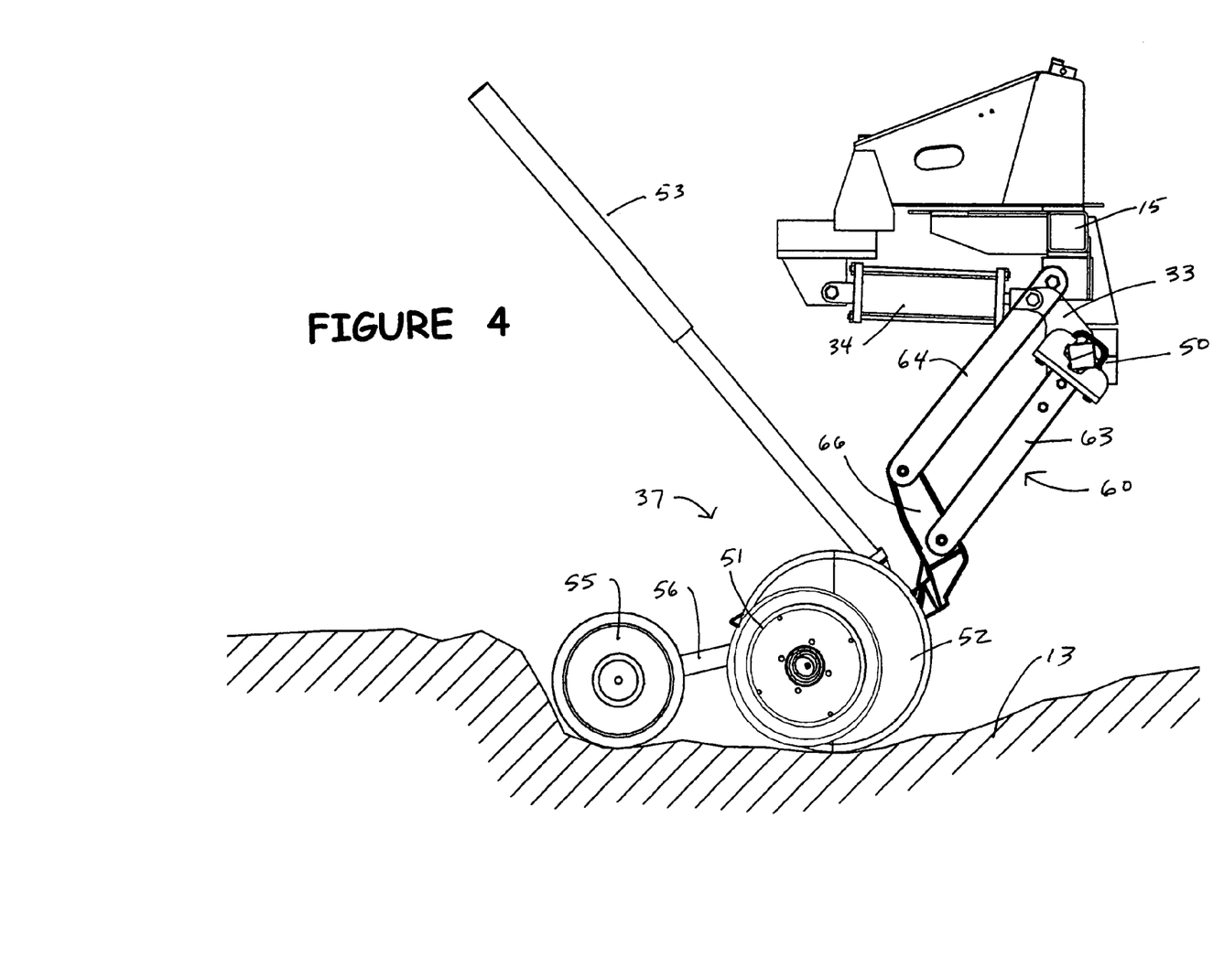
FIG. 4 is a close-up view of a portion of a planter assembly of the seed planter shown in FIG. 3.

FIGS. 3 and 4 show machine 10 traversing irregular terrain 13. FIG. 3 shows the planter assembly 37 in a depression in the terrain. Parallelogram linkage 60 deflects whereby the planter assembly 37 is maintained in a generally horizontal orientation. FIG. 3 also shows a rear planter assembly 43 working higher ground yet in parallel relationship to the forward planter assembly 37.

Figure 6:
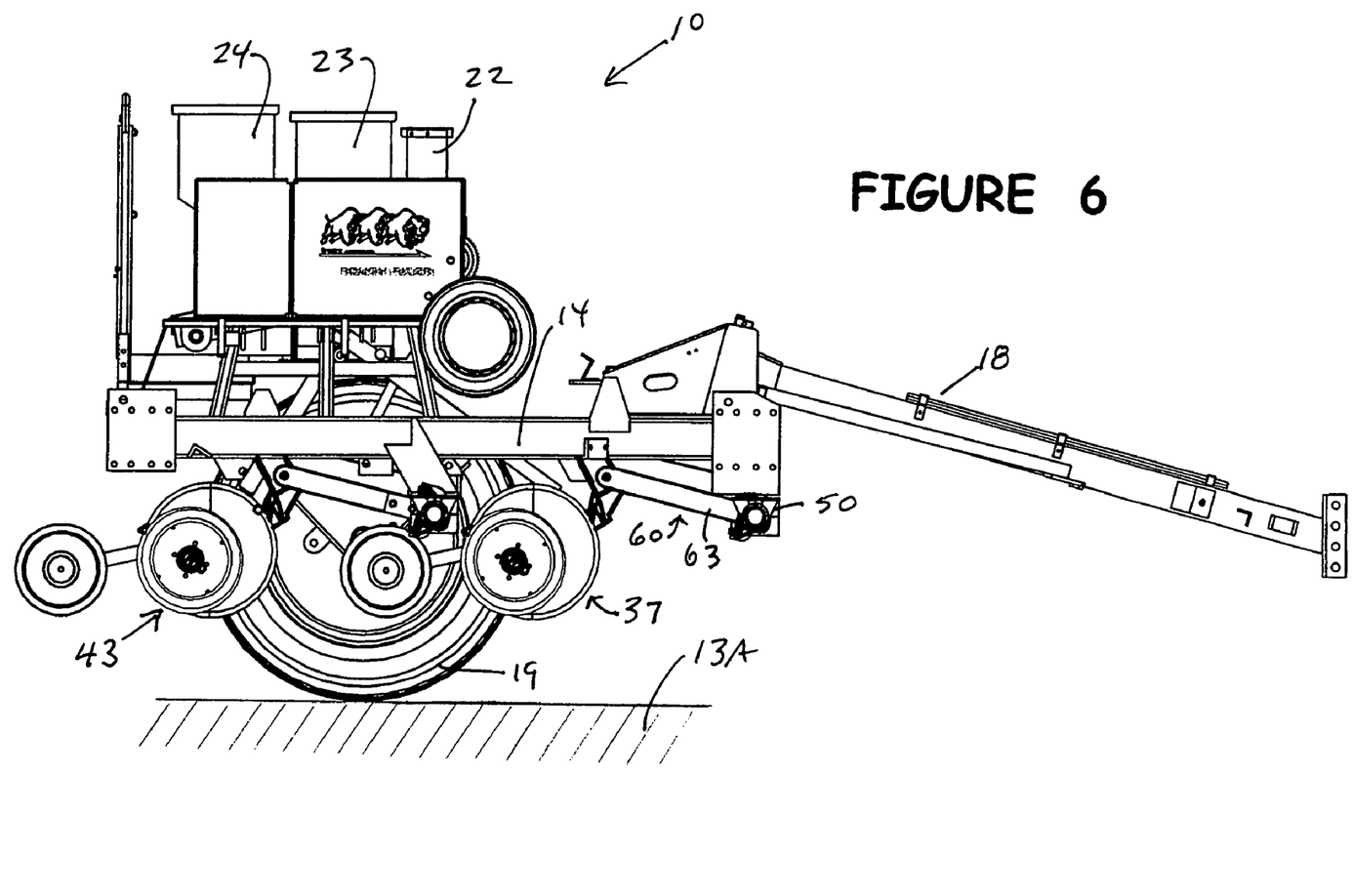
FIG. 6 is a side view of the seed planter like that of FIG. 3 but showing the planting assemblies raised for over-the-road transport.

FIG. 6 shows both the forward and rearward ranks of planters assemblies raised for transport over flat terrain 13A. The planter assemblies are maintained at a consistent angular orientation.

Figure 7:
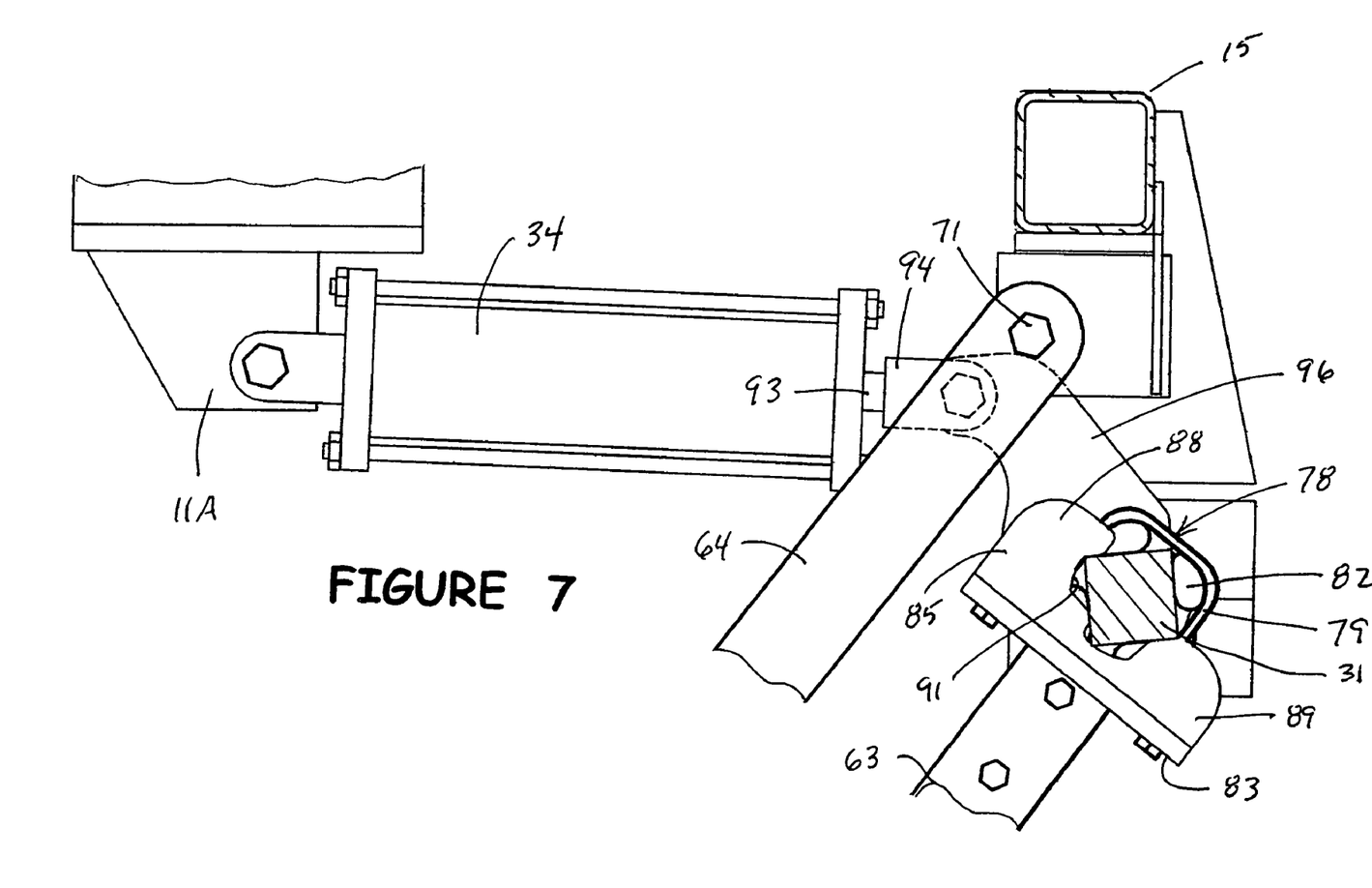
FIG. 7 is a close-up view of the torsion joint shown in FIG. 4.
Figure 8:
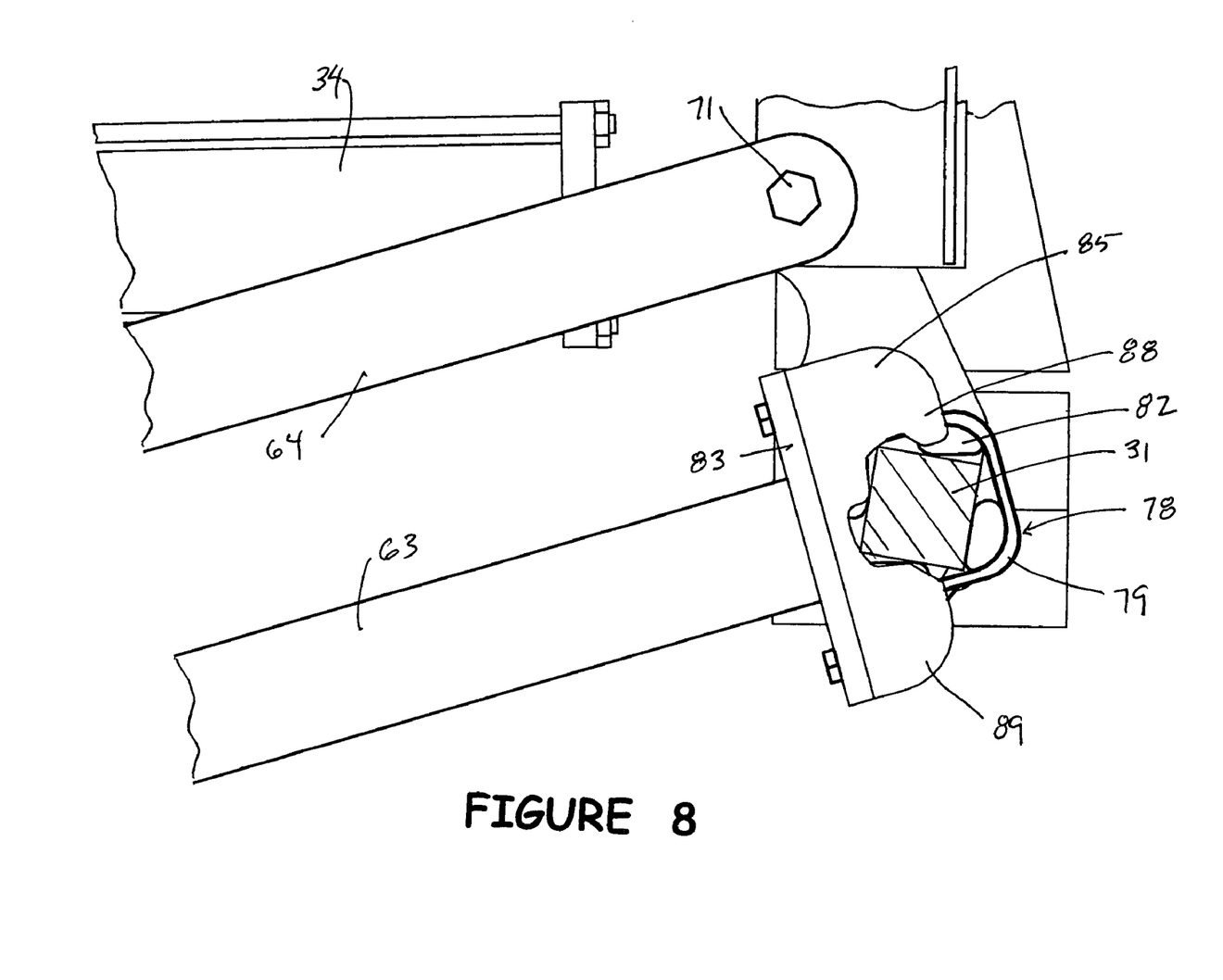
FIG. 8 is a close-up view of the torsion joint of FIG. 7 but with the planting equipment linkage rotated to another position with respect to the rock shaft.
Figure 9:
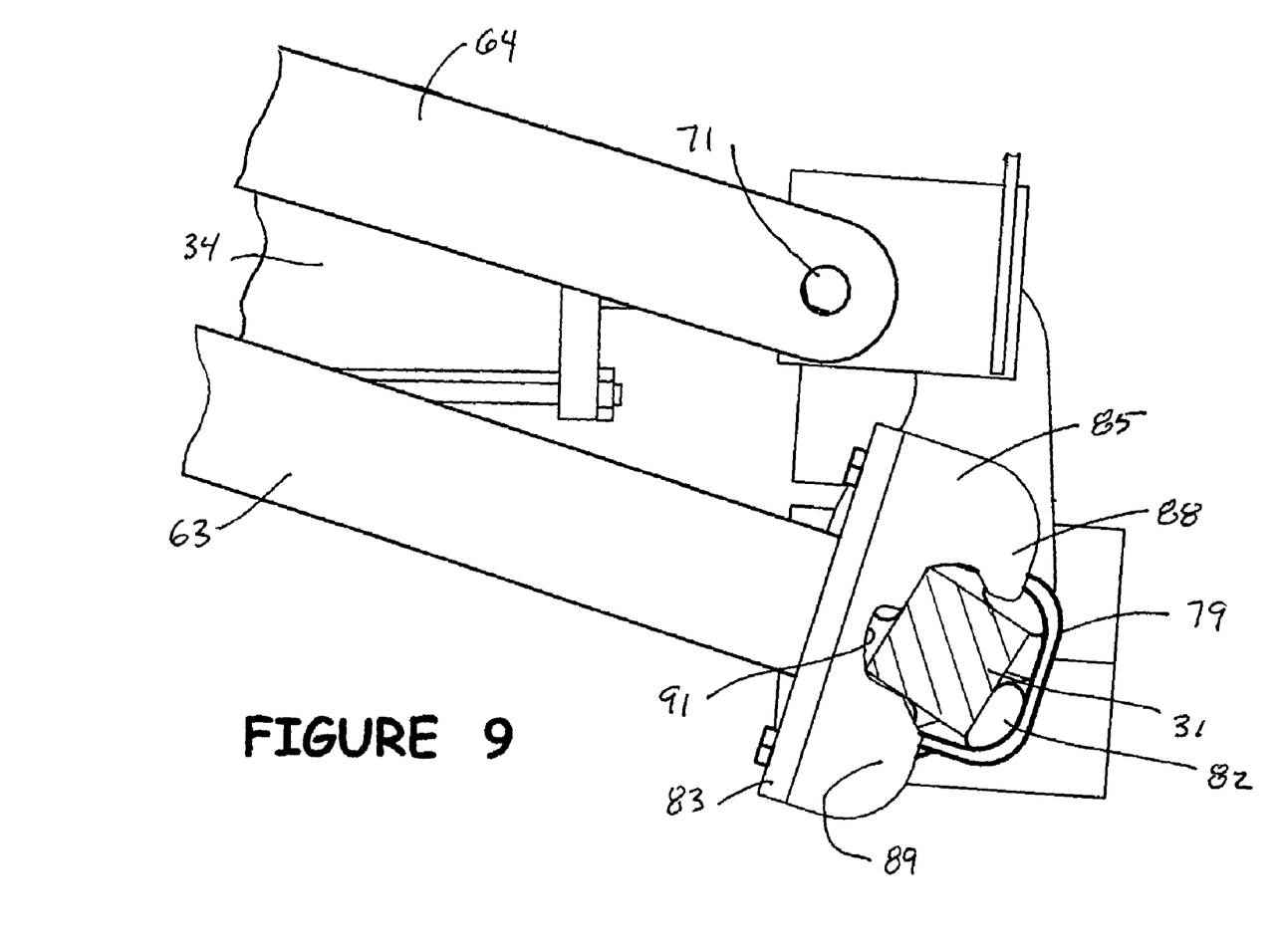
FIG. 9 is a close-up view of the torsion joint of FIG. 7 but with the planting equipment linkage rotated to yet another position with respect to the rock shaft.

Referring to FIGS. 7-9 torsion joint assembly 50 includes a pair of side-by-side box-like housings 79, 80. Rock shaft 31 has a generally square cross-sectional shape. Housings 79, 80 are mounted in diagonal relationship to rock shaft 31. The interior corners of the housings 79, 80 face flat surfaces of rock shaft 31. The interior corners of the housings 79, 80 are filled with torsion spring elements 82. The backs of the housings 79, 80 are closed by a mounting plate 83. Mounting plate 83 is fixed to the fixed ends of the lower struts 63, 72. Rotational movement of the housings 79, 80 relative to the rock shaft 31 results in a return moment produced by deformation of the torsion spring elements 82.

A stop plate 85 is fixed to the mounting plate 83 for rotation with it relative to the rock shaft (see FIG. 5). Stop plate 85 has an edge that defines an open jaw which at least partially encompasses the rock shaft 31. An edge of plate 85 has an upper jaw 88 and a lower jaw 89 that together define a jaw opening 91. The jaw opening 91 is configured to permit limited rotational movement of the rock shaft within the jaw opening. Upon a pre-determined amount of rotation the jaw locks or jams on the rock shaft 31 by intercepting the surfaces of the rock shaft to prohibit further movement of the torsion joint housing on the rock shaft. This prevents the torsion joint elements from moving to an over center and ineffective position.

Stop plate 85 permits normal up and down movement of the planter assembly going over rough ground. The stop plate 85 prevents extreme rotation of the torsion joint housing on the rock shaft that would cause the torsion joint spring elements to become dislodged from their proper positions in the torsion joint housing.

Referring to FIG. 7, the planting equipment linkage 60 is deflected in an extreme downward position. The stop plate 85 has rotated relative to the rock shaft 31 to a point where the upper jaw 86 intercepts a side of the rock shaft 31 and the lower jaw 89 intercepts an opposite side of the rock shaft 31. The rock shaft 31 is jammed in the jaw opening 91 whereby further rotation of the planter assembly is inhibited. The weight of the planter assembly is carried by the stop plate 85 instead of the torsion spring elements 82.

FIG. 8 shows the planting equipment linkage 60 in an intermediate position as the planter assemblies are moved over a terrain. The rock shaft 31 is clear of the upper and lower jaws 88, 89 of the stop plate 85. Rotation of the torsion joint 50 is permitted on rock shaft 31 and between the extremes dictated by jaw opening 91.

FIG. 9 shows the mounting beam assembly deflected in an extreme upward position. At some point along the path of rotation to that extreme position the upper and lower jaws 88, 89 have locked or jammed against the sides of the rock shaft 31. Past this locking point the weight of the planter assembly is borne by the stop plate.

The forward hydraulic piston-cylinder motor 84 serves the purpose of rotating the rock shaft 31 between a position where the planter assemblies are lowered and working as shown in FIG. 3, and a raised position as shown in FIG. 6 for transport over the road. As shown in FIG. 7, hydraulic motor 34 is connected at one end to a frame part 11A. The other end has an extendable and retractable rod 93. The outer end of the rod 93 is connected to a bracket 94. Bracket 94 is connected to the rotatable end of L-shaped crank arm 33. The other end of the L-shaped crank arm 96 is securely attached to the rock shaft 31. Rotation of the crank arm 96 is effective to rotate the rock shaft 31 to raise or lower the planter assemblies.

The embodiments of the invention in which an exclusive property or privilege is claimed are defined as follows:

1. A seed planter comprising:
   a wheel mounted frame for movement over soil to be planted;
   at least one lateral rock shaft connected to the frame;
   a frame member parallel to the rock shaft and spaced from it;
   a plurality of seed planter assemblies connected to the rock shaft;
   each seed planter assembly including:
      a torsion joint assembly connected to the rock shaft;
      a planting equipment yoke;
      planting equipment connected to the planting equipment yoke;
      a parallelogram linkage connecting the torsion joint assembly and the planting equipment yoke;
   said parallelogram linkage having an upper strut and a lower strut parallel to the upper strut, said upper and lower struts having movable ends pivotally connected to a connecting bar, said connecting bar rigidly connected to the planting equipment yoke;
   one of said struts having a fixed end connected to the torsion joint assembly;

the other of said struts having a fixed end pivotally connected to the frame member whereby a parallelogram is formed between the upper and lower struts and the connecting bar and an imaginary line connecting the fixed ends of the upper and lower struts.

2. The seed planter of claim 1 wherein:
the torsion joint assembly includes a box-like housing and a plurality of torsion spring elements located in the housing and bearing against the rock shaft.

3. The seed planter of claim 2 wherein:
the rock shaft is generally square;
the torsion joint housing is mounted diagonally on the rock shaft with interior corners facing flat surfaces on the rock shaft;
said torsion spring elements lodged in interior corners of the torsion joint housing and bearing against surfaces of the rock shaft.

4. The seed planter of claim 3 wherein:
said rock shaft is generally square;
a stop plate fixed to the torsion joint housing for rotation with it relative to the rock shaft;
said stop plate having an edge with an upper jaw and a lower jaw that define a jaw opening at least partially encompassing the rock shaft, said jaw opening configured to permit limited rotational movement of the rock shaft within the jaw opening so that upon a predetermined amount of rotation the jaws lock on the rock shaft by intercepting surfaces of the rock shaft to prohibit further of the torsion joint housing on the rock shaft.

5. The seed planter of claim 4 wherein:
the frame member is located above the rock shaft;
said lower strut is a first lower strut and has a fixed end connected to the torsion joint assembly; and
a complementary second lower strut mounted in parallel relationship to and for coaxial rotation with the first lower strut, having a fixed end connected to the torsion joint assembly and a movable end pivotally connected to the planting equipment yoke.

6. The seed planter of claim 5 wherein:
said torsion joint assembly includes a box-like housing and a plurality of torsion spring elements located in the housing and bearing against the rock shaft;
said torsion spring elements lodged in corners of the torsion joint housing and bearing against surfaces of the rock shaft.

7. The seed planter of claim 6 wherein:
said rock shaft is a forward rock shaft;
an aft rock shaft having an aft rank of planter assemblies.

8. The seed planter of claim 1 wherein:
the frame member is located above the rock shaft; and
the lower strut has a fixed end connected to the torsion joint assembly.

9. The seed planter of claim 8 wherein:
said lower strut is a first lower strut;
a complementary second lower strut mounted in parallel relationship to and for coaxial rotation with the first lower strut, having a fixed end connected to the torsion joint assembly and a movable end pivotally connected to the planting equipment yoke.

10. The seed planter of claim 9 wherein:
said planting equipment includes a furrowing disk, a depth gauge wheel, a seed shoe and a press wheel.

11. The seed planter of claim 9 wherein:
said rock shaft is a forward rock shaft;
an aft rock shaft having an aft rank of planter assemblies.

12. The seed planter of claim 11 wherein:
said torsion joint assembly includes a box-like housing and a plurality of torsion spring elements located in the housing and bearing against the rock shaft;
the rock shaft is generally square;
said torsion spring elements lodged in corners of the torsion joint housing and bearing against surfaces of the rock shaft.

13. A seed planter comprising:
a wheel mounted frame for movement over soil to be planted;
at least one lateral rock shaft connected to the frame and having a generally square cross-sectional shape;
a plurality of seed planter assemblies connected to the rock shaft;
each seed planter assembly including a torsion joint assembly connected to the rock shaft, a planting equipment yoke, planting equipment connected to the planting equipment yoke, and a linkage connecting the torsion joint assembly and the planting equipment yoke;
said torsion joint assembly including a housing mounted on the rock shaft;
a stop plate fixed to the torsion joint housing for rotation with it relative to the rock shaft;
said stop plate having an edge with an upper jaw and a lower jaw that define a jaw opening at least partially encompassing the rock shaft, said jaw opening configured to permit limited rotational movement of the rock shaft within the jaw opening so that upon a predetermined amount of rotation the jaws lock on the rock shaft by intercepting surfaces of the rock shaft to prohibit further of the torsion joint housing on the rock shaft.

14. The seed planter of claim 13 wherein:
said torsion joint housing is a box-like housing and is mounting diagonally on the rock shaft with interior corners facing flat surfaces on the rock shaft, and a plurality of torsion spring elements lodged in interior corners of the torsion joint housing and bearing against surfaces of the rock shaft.

15. A torsion joint assembly for installation on a rock shaft comprising:
a box-like torsion joint housing for mounting diagonally on a square rock shaft with interior corners of the housing facing flat surfaces of the rock shaft, and a plurality of torsion spring elements lodged in interior corners of the housing so as to bear against surfaces of a rock shaft when the housing is installed on a rock shaft so that rotational movement of the housing relative to the rock shaft results in a return moment produced by deformation of the torsion spring elements;
a stop plate fixed to the torsion joint housing for rotation with it relative to a rock shaft when the housing is installed on a rock shaft;
said stop plate having an edge with an upper jaw and a lower jaw that define a jaw opening for at least partially encompassing a rock shaft, said jaw opening configured to permit limited rotational movement of a rock shaft within the jaw opening so that upon a predetermined amount of rotation the jaws lock on the rock shaft by intercepting surfaces of the rock shaft to prohibit further of the torsion joint housing on the rock shaft.

* * * * *